March 12, 1940. SAMU-EL ISH-SHALOM 2,193,004
APPARATUS FOR MIXING AND STERILIZING SOLIDS
Filed July 15, 1939 7 Sheets-Sheet 2

INVENTOR.
SAMU-EL ISH-SHALOM
BY
ATTORNEY.

INVENTOR.
SAMU-EL ISH-SHALOM
BY Harry Radzinsky
ATTORNEY.

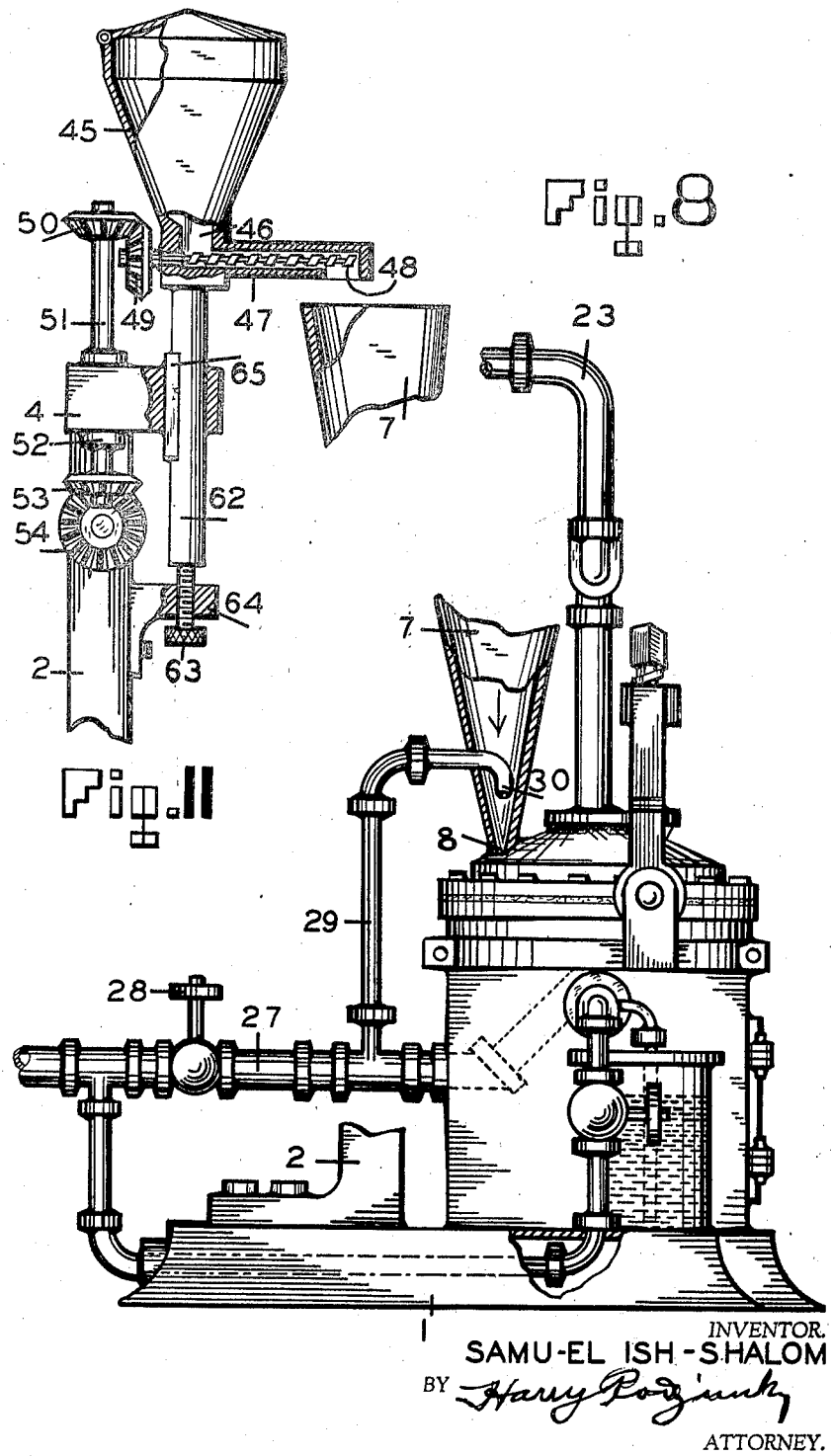

Patented Mar. 12, 1940

UNITED STATES PATENT OFFICE

2,193,004

APPARATUS FOR MIXING AND STERILIZING SOLIDS

Samu-El Ish-Shalom, Brooklyn, N. Y.

Application July 15, 1939, Serial No. 284,668

5 Claims. (Cl. 259—4)

This invention relates to means for mixing materials, such as those used in the manufacture of cosmetics and is primarily intended to be used for mixing powdered base materials and coloring matter or pigments in a stream of purified air or other gas moving at a great speed and under great compressional energy.

It is an object of this invention to provide a new method for automatically treating the different materials during the mixing process and to provide a novel apparatus for perfuming and for applying a spray of disinfecting or other fluid having sterilizing and healing properties to the different materials in conjunction with the mixing process in an apparatus so constructed and provided with an arrangement of such character that this may be carried out continuously and automatically in conjunction with the mixing.

The invention has for a further object to provide novel means for controlling the different operations of the apparatus, whereby predetermined proportions of a plurality of powdered materials and coloring matter are fed into an air-float mixing chamber; and whereby predetermined applications of spray of different fluids is assured without undue waste, means being also provided so that the mixing chamber and atomizers may be operated continuously and simultaneously from the same source of power.

It is also an object of this invention to provide an improved arrangement in a device provided with means for continuously discharging mixed powdered materials from an air-float mixing chamber and to utilize atomizer means which communicate with the mixed material discharge passageway for continuously applying a spray of a fluid, whereby micro-organisms within the mixed materials are destroyed.

It is also a further object of the invention to provide a method whereby finely divided powdered materials may be mixed under sterile conditions and sprayed with an atomizer liquid possessing germicidal or anti-septic properties.

Another object of the invention is to provide an improved mixing chamber and air-float regulating and discharging means wherein the air inlets are arranged in groups of two placed in angular relation to each other, so that they will efficiently forward the material to the adjacent group of air inlets.

Still another object of the invention is to provide a material mixer and material delivery assemblage, the various parts of which are conveniently adjustable to produce most efficient operation and all parts of which are readily accessible for inspection, cleaning and adjustment.

It is a further feature of the invention that the improved apparatus is of simple construction and easy to maintain in a sanitary condition.

It is a further object of the invention to provide an apparatus for carrying out the above processes which will be capable of operating continuously at a high rate of output and wherein all parts of the apparatus which are to come in contact with the different materials are of a non-corroding and non-oxidizing material.

A further object of the invention is to provide an improved automatic mixer for powdered materials which may be manufactured and sold relatively at a minimum cost and which may also be assembled in units of variable capacities to suit different requirements and require a minimum consumption of power.

To this end the novel apparatus comprises, an air-float mixing chamber, a primary hopper for the powdered base materials, a plurality of auxiliary hoppers for feeding coloring materials and pigments, any one of which may be easily brought into operative position, atomizer means for continuously and automatically applying onto the materials, as by spraying thereon, fluids suited to meet the particular requirements.

This method does away entirely with guess work and enables one to easily vary the texture and lighten or darken the shade of the mixed materials as it is important that the coloring matter be perfectly blended with the powdered base materials, as the improper mixing of the coloring materials with the powdered base materials impairs the desired qualities of the product and results in complaints from the consumer, with attendant unpleasantness and loss. By this new method not only is the base material and coloring matter perfectly blended in a manner which has been impossible heretofore with existing methods and equipment, but a spray of perfume or similar fluid is continuously added without interruption in the same device at the same time.

This application is closely related to my copending applications, Ser. No. 278,513, entitled "Continuous sterilizers" and Ser. No. 280,785, entitled "Apparatus for mixing materials."

In the accompanying drawings constituting a part hereof and in which like reference characters indicated like parts:

Fig. 7 is a view similar to Fig. 5, showing a modified form of mixing chamber;

Fig. 8 is a side elevational view of a portion of the apparatus showing particularly the feed duct to the mixing chamber;

Fig. 11 is a side elevational view of one of the auxiliary hoppers, some parts being broken away for clearness.

Figure 1:
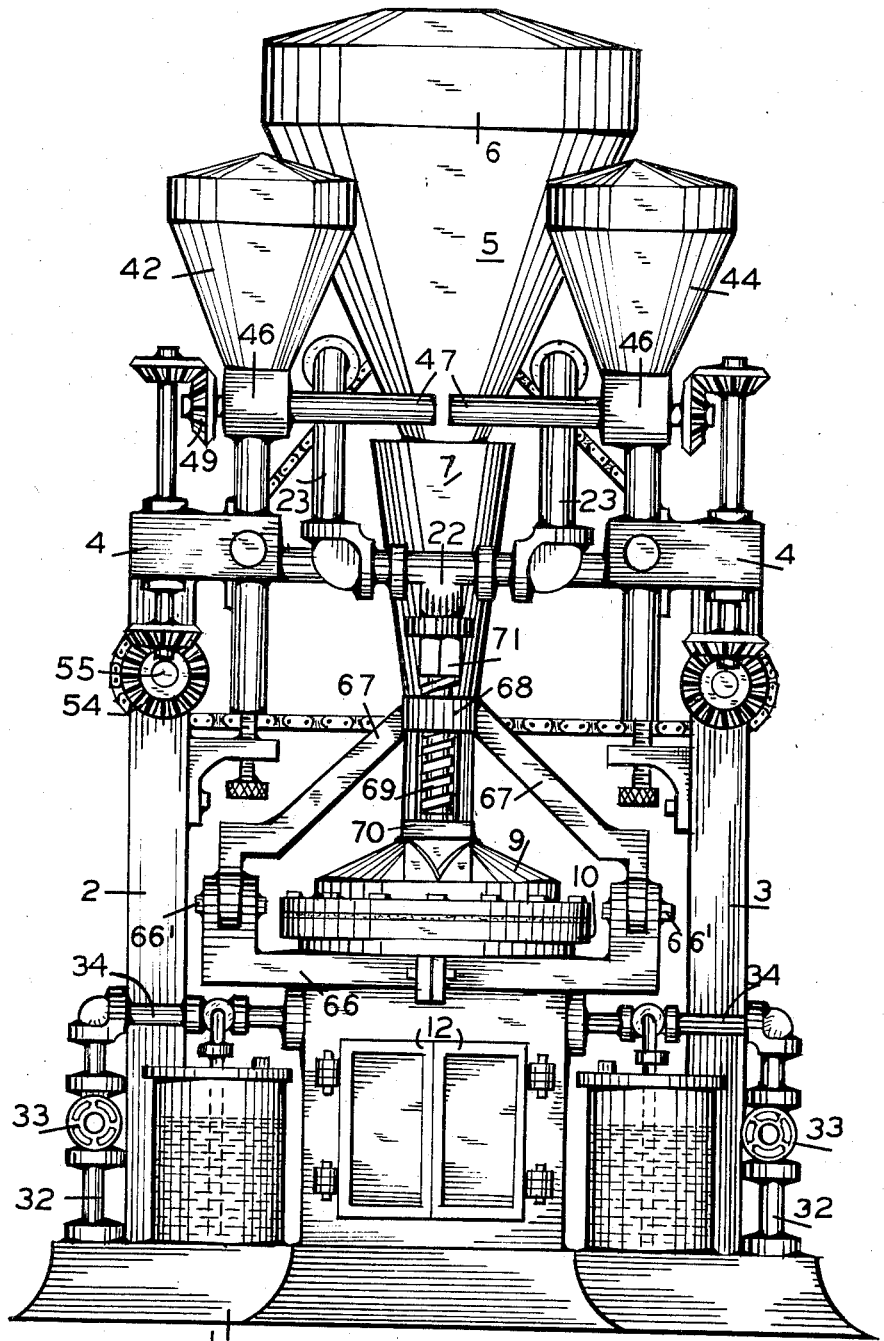
Fig. 1 is a front elevational view of one form of apparatus made in accordance with my invention.
Figure 2:
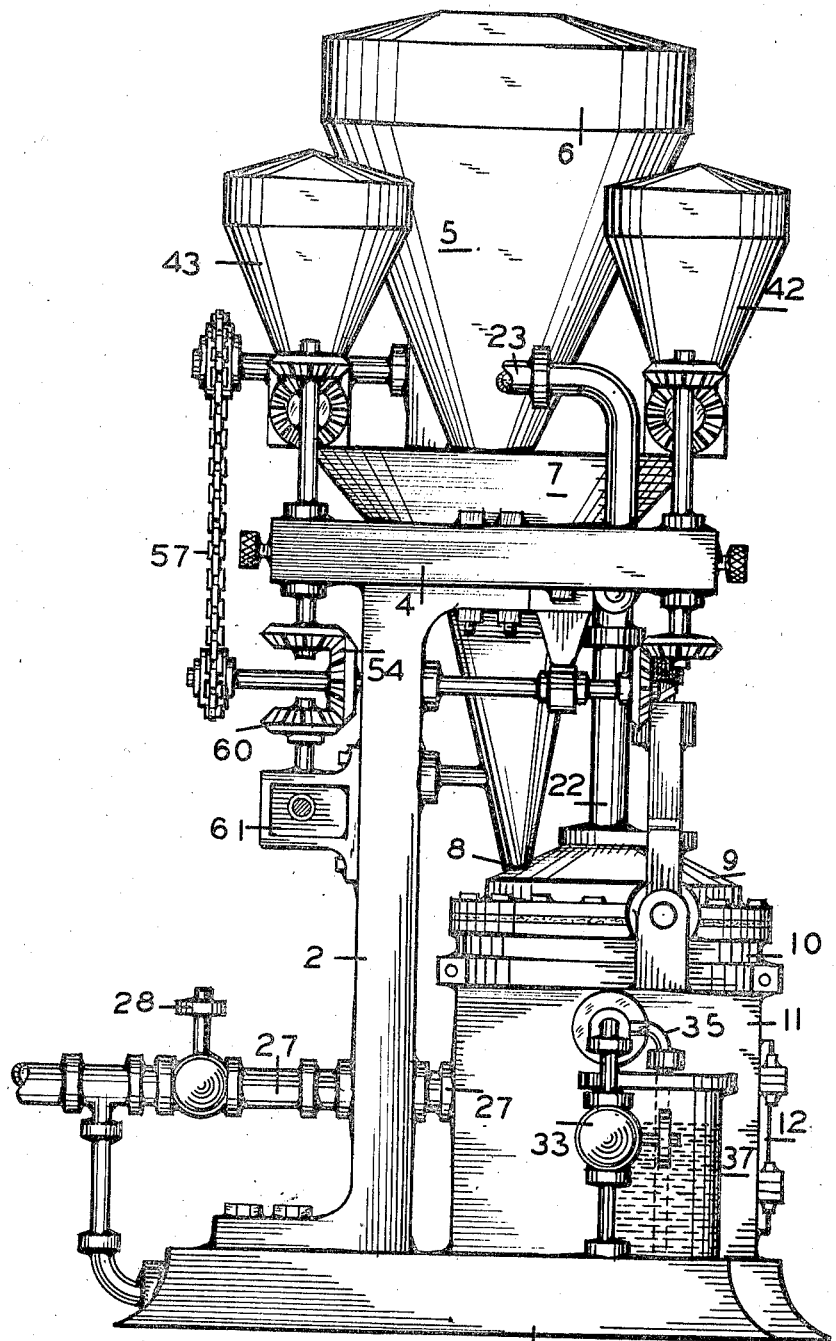
Fig. 2 is a side elevational view thereof.

The apparatus comprises a base 1 and a pair of vertical standards 2 and 3 united by cross member or beam 4 to give a rigid structure. A principal hopper 5 of relatively large size, provided with a cover 6 is secured to the upper part of the frame so formed. The lower end thereof communicates with a feed duct 7 usually of conical shape terminating at its lower end 8 in the cover 9 of mixing chamber 10. Said mixing chamber rests upon and is supported by a box-like structure 11 having doors 12 to allow access into the same.

The mixing chamber 10 comprises an inner annular wall 13 and an internal annular wall 14 defining an annular space 15 having inlet pipes 16 for air or other gas under pressure. A series of hollow fingers 17 on wall 14 project into the mixing chamber and communicate with gas chamber 15. Said fingers are provided with angularly placed openings 18 and wall 14 is provided with co-operating openings 19 at an angle to openings 18 whereby the streams of air emerging from pairs of openings 18 and 19 converge and cross as shown at 20.

Figure 4:
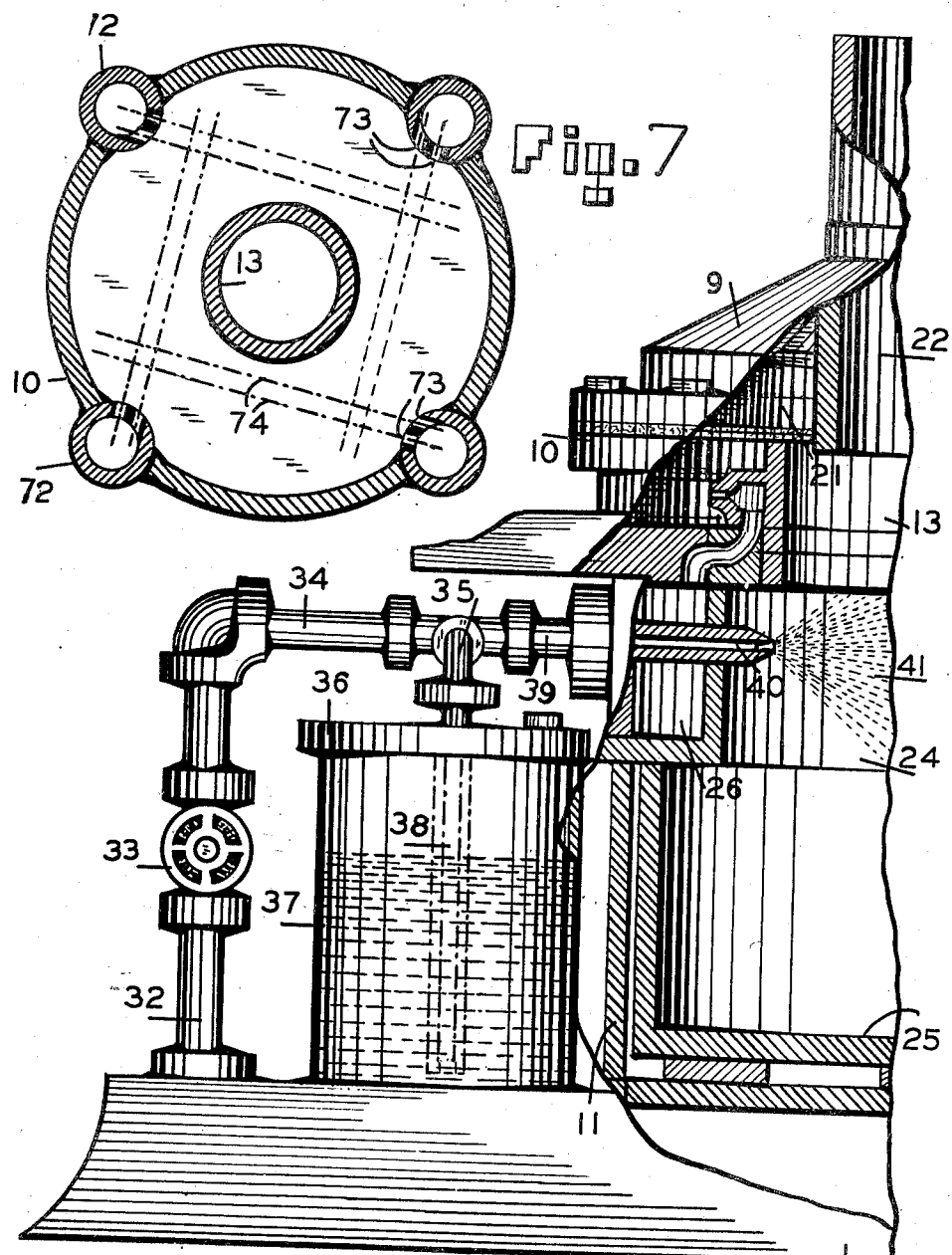
Fig. 4 is an enlarged fragmentary view of a portion of the apparatus showing particularly the spray devices.

As more particularly shown in Fig. 4, an annular exit opening is provided for mixing chamber 10 at 21, immediately adjacent to wall 13. A gas exit pipe 22 has its lower opening adjacent to the exit opening 21 and is provided with upwardly extending branch pipes 23. Below exit opening 21 is a space 24 at the bottom of which is a receptacle 25 within the box 11 for the reception of the mixed and sprayed materials. Said receptacle 25 may be removed through the doors 12.

An annular space 26 below mixing chamber 10 and communicating with pipes 16 is supplied through pipe 27 and valve 28 with air or other gas under suitable pressure. A branch pipe 29 from pipe 27 terminating at 30 in a downwardly extending opening in feed duct 7 assists in causing the material to flow from the hoppers into the mixing chamber. Branch pipes 31 from the principal air pipe 27 communicate with their respective pipes 32 having valves 33 therein secured to pipes 34 and having branches 35 passing through the covers 36 of fluid containers 37. Extensions 38 lead to the bottom of fluid containers 37. Atomizing nozzle 39 is operatively connected to pipes 34 and 35 and terminate in the spray ends 40 whereby a combination of gas and liquid provides the sprays 41. Preferably and as more clearly shown in Figs. 1 and 3, the sprays 41 are in opposed directions.

Figure 3:
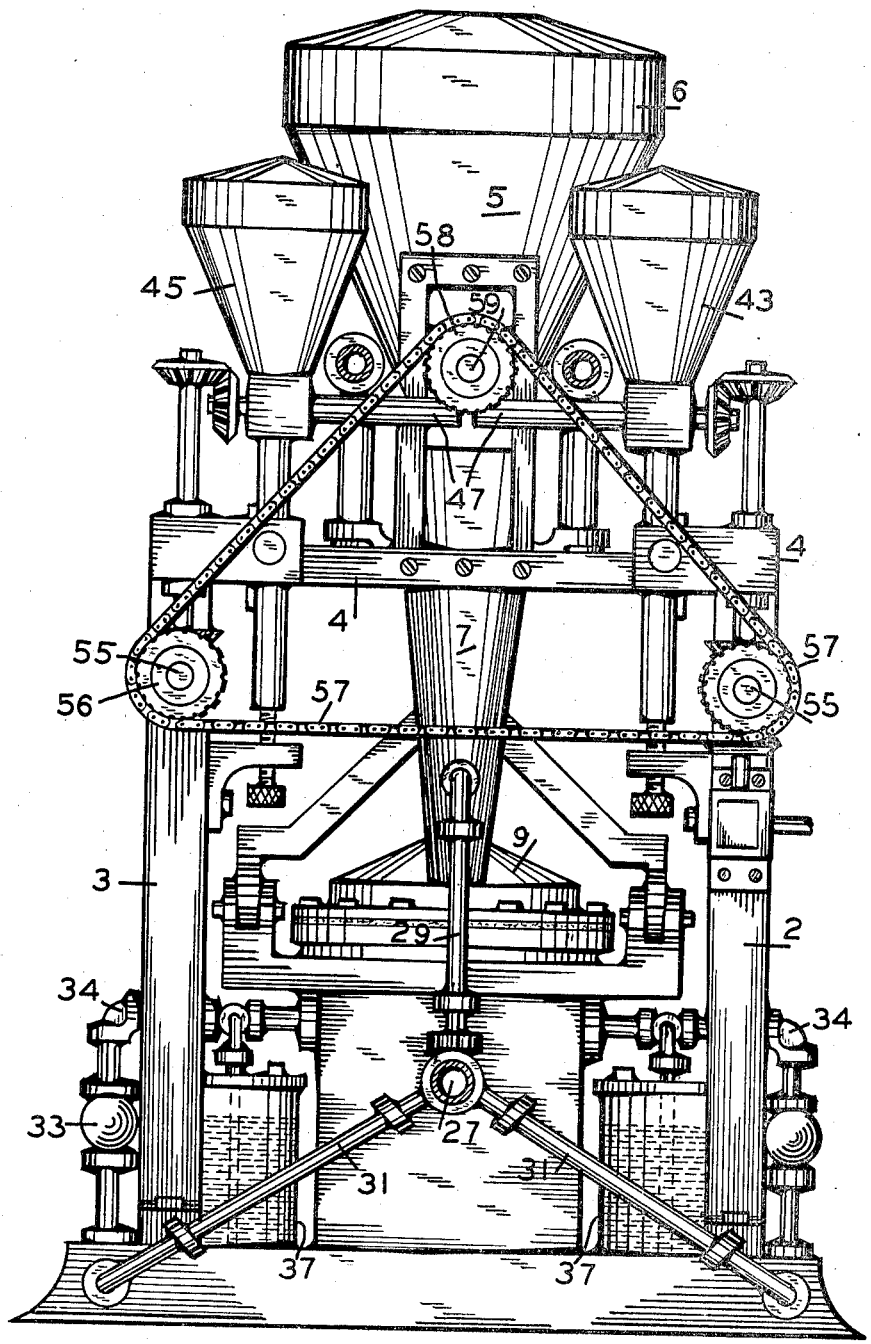
Fig. 3 is a rear elevational view thereof.

A series of auxiliary hoppers 42, 43, 44 and 45 are suitably secured on the top of frame 4. Each of said auxiliary hoppers is provided with a box-like member 46 having a laterally extending tube 47 with a downwardly extending opening at the free end thereof communicating with the open end of feed duct 7. A screw conveyer 48 is provided in said extension for feeding material from the hoppers into the duct. Bevel gear 49 meshes with horizontally placed bevel gear 50 on shaft 51 held in bearing 52 in frame 4. A similar bevel gear 53 meshes wth vertically placed bevel gear 54 on shaft 55. Said shaft also carries sprocket wheel 56 which links with chain 57. As shown in Fig. 3, two such sprockets are provided and the chain passes over an additional sprocket wheel 58 on shaft 59, which operates a screw conveyor (not shown) in principal hopper 5 similar to that shown in Fig. 11. Driving means for the several screw conveyors is provided in bevel gear 60 meshing with gear 54 and operatively secured to reduction gearing 61, operated by a suitable source of power.

Figure 12:
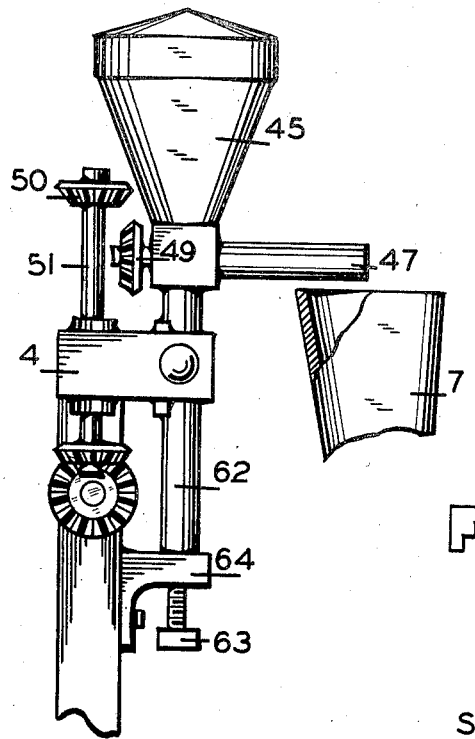
Fig. 12 is a view similar to Fig. 11 showing the operating mechanism for said auxiliary hoppers in an inoperative position.

Each of the auxiliary hoppers is provided with means whereby the same may be rendered inoperative, as shown more particularly in Figs. 11 and 12. A bar 62 is secured to the structure 46 and rests upon a screw 63 threaded into bracket 64 on standard 2. An angular groove provided in member 65 secured to frame 4 co-operates with a similar projection on bar 62, thus holding the auxiliary hoppers in place and providing for vertical movement only thereof. In Fig. 11 gears 49 and 50 are shown as being meshed. When screw 63 is turned to the left, it allows bar 62 to be lowered until it rests upon bracket 64 as shown in Fig. 12, in which position gear 49 has been disengaged from gear 50. Also extension 47 although having been lowered, is slightly above feed duct 7 and does not interfere with the operation thereof.

Figure 9:
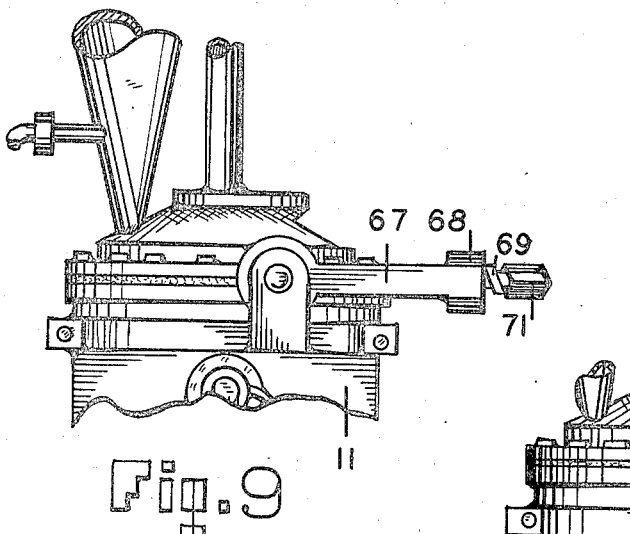
Fig. 9 is a fragmentary view of the outside of the mixing chamber showing the cover locking means released.
Figure 10:
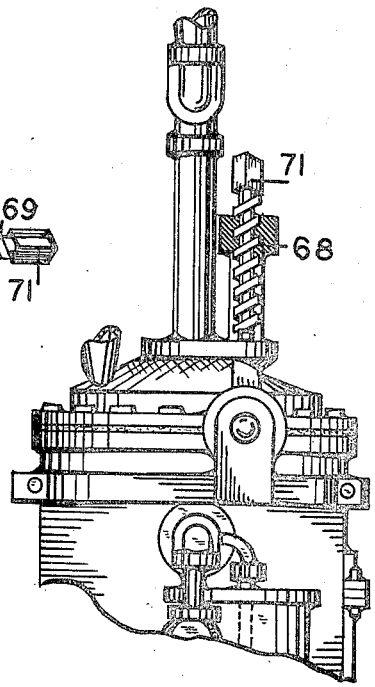
Fig. 10 is a view similar to Fig. 9 but with the cover locking mechanism in operative position.

A yoke 66 having hinges 66' is secured to the lower side of mixing chamber 10. A yoke 67 hinged at 66' has a collar 68 formed in the upper portion thereof, in which a screw member 69 is threaded. Said member is provided at its lower end with a pressure block 70 and at its upper end with an angular head to allow operation of a suitable wrench. In the position shown in Fig. 1, block 70 contacts with cover 9 of the mixing chamber and holds the same firmly in position. When it is desired to remove the cover, the screw head 71 is turned to the left and the yoke 67 is moved into a horizontal position, as shown in Fig. 9; thereby cover 9 is released and may be removed.

In Fig. 7 I have shown a different form of mixing chamber. It is provided with an outer annular wall 10 and an inner concentric wall 13. As shown, it is provided with a series of four circular chambers 72 for air or other gas under pressure communicating with pipes 16. Each is provided with a pair of openings 73 leading into the annular mixing chamber in such a manner that parallel streams 74 of gas are injected into the same. These pairs of streams cross at right angles and by the co-operation thereof impart a whirling action within the annulus.

Figure 5:
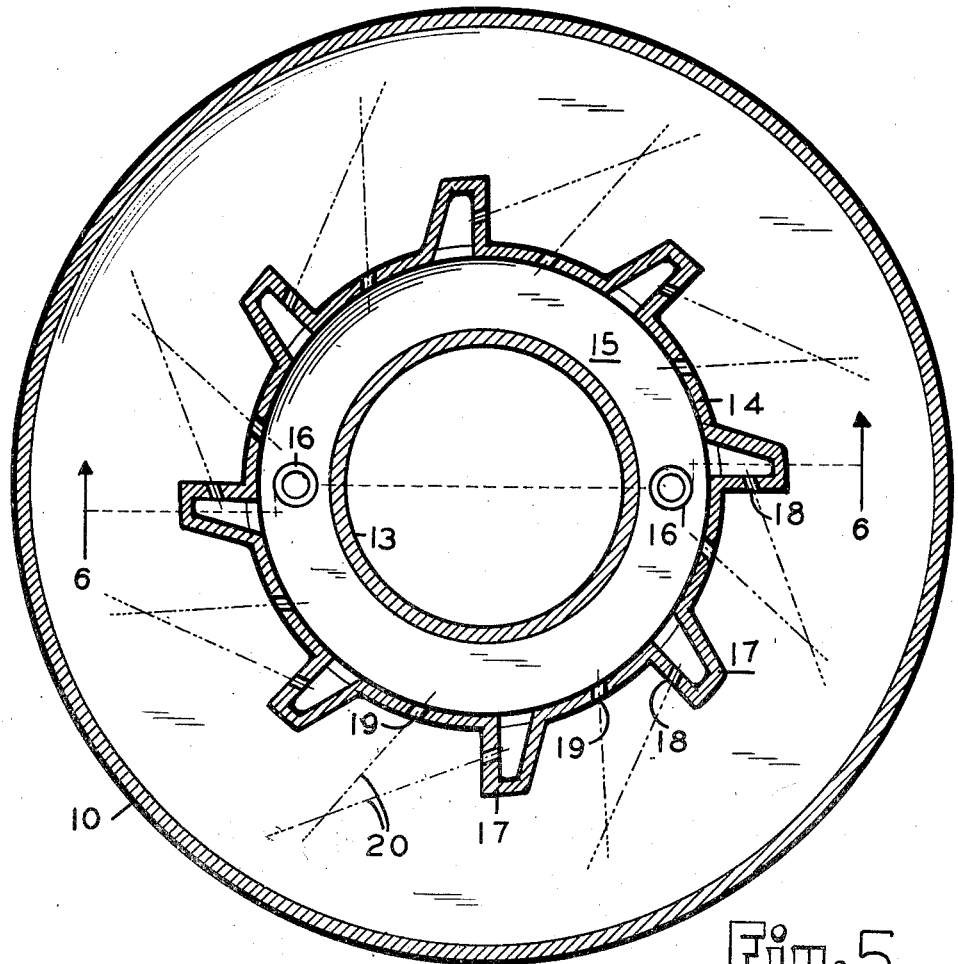
Fig. 5 is a cross-sectional view of the mixing chamber, somewhat enlarged.
Figure 6:
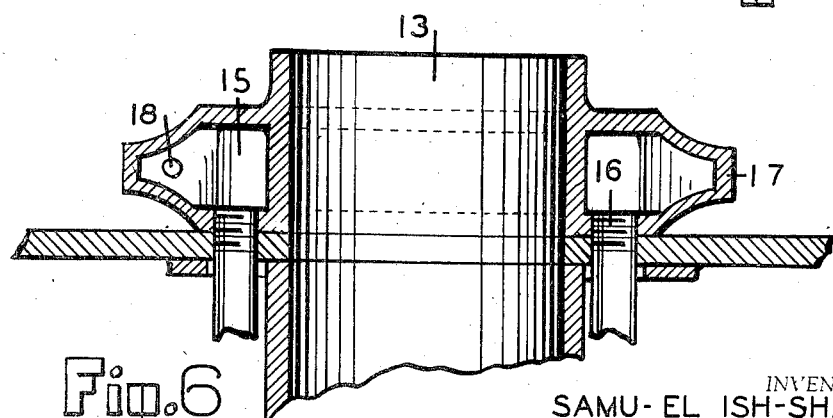
Fig. 6 is a vertical cross-sectional view taken along the lines 6—6 of Fig. 5.

In the operation of the device the principal ingredient for the mixture is contained in the hopper 5 and material therefrom by the movement of chain 57 causes material to be fed into the duct 7. At the same time the operation of one or more auxiliary hoppers 42, 43, 44, 45 causes a suitable proportion of auxiliary materials to pass into duct 7 through the end openings in extensions 47. The materials fall through cover 9 and into annular chamber 10. Compressed air or other gas enters through pipes 16 and through openings 18 and 19 as shown in Fig. 5 or openings 73 as shown in Fig. 7, carrying the materials to be mixed around the annular mixing chamber, whirling and mixing the same thoroughly and uniformly. After this action is complete the mixed materials together with the gas are transported through annular exit opening 21 where by reason of the centrifugal action, a separation takes place, so that the exit gas passes upwardly and outwardly through pipes 22 and 23. The mixed materials fall gently downward due to the action of gravity and through the space 24. Liquid from one or more of the receptacles 37 is sprayed as shown at 41 through the action of spray nozzle 39 into the space 24 so that the finely divided mixed materials intimately contact with the finely divided liquid spray and thus uniform mixture of the liquid and solid constituents is obtained. The uniform mixture falls into receptacle 25 where it may be allowed to accumulate and may be removed by the doors 12 or in any other suitable manner.

From the foregoing description, it will be apparent that the present invention provides a simple, extremely flexible and highly efficient mixer and material delivery structure, which may be manufactured and operated at a minimum cost. By proper provision of gearing a single or multiple drive may be utilized to operate any number of hopper units which may be provided to deliver powdered materials into the air float mixing chamber, and while a specific arrangement of the hoppers has been illustrated therein, it will be understood that other combinations may be provided dependent upon the results desired.

While there is shown in the drawings an atomizer arrangement which has been proven practical by experiment, it is to be noted that many different atomizer arrangements may be designed and any suitable atomizer valve may be so modified that the spray will be directed forward or downward into the collector of the mixed powdered materials. The communicating means between the atomizer and the collector of the mixed materials may be varied to suit different requirements. The arrangement may also be so varied that the atomizer discharge openings shall communicate directly with the mixing chamber and the spray shall be applied onto the materials therein. One or both fluid containers may be used for the same or different fluids as may be desired. The arrangement also permits any one of the auxiliary hoppers to be easily brought into and out of operative position by manipulating a hand-screw or similar arrangement. The air inlet openings in the mixing chamber are arranged around the collector passage way, which is in this case provided with a separator ring extending above the air inlet supply and air flow equalizing air reservoir. While the air inlets are arranged in groups of two placed in angular relation to each other from inside out, it is also anticipated that the air inlet openings may be arranged in pairs and the air flow may be directed in a parallel relation to each other to efficiently agitate and impart a forward movement of the materials to be mixed.

These and other changes and variations in the details may be made in the operation of this invention within the spirit thereof, and the invention is not to be limited except by the character of the claims appended hereto.

I claim:

1. In a mixing apparatus, an annular chamber provided with a plurality of openings for gas, said openings being angularly placed to impart a whirling action to said gas, said openings being arranged in pairs whereby the gas streams emanating from each pair of openings are in close proximity to one another and tend to cross one another but not cross the other streams and, means for introducing a plurality of finely divided materials into said chamber at a single location but from separate sources of supply for mixture by the whirling action of the gas streams.

2. In a mixing apparatus, a mixing chamber provided with spaced, concentrically-arranged inner and outer walls producing an annular mixing channel between them, the inner wall defining an air-receiving chamber and having spaced, radially-extending hollow fingers extending into the mixing channel, the wall of each finger being angularly apertured to provide communication between said air-receiving chamber and the mixing channel, the inner wall being provided at points between the fingers with air-passing apertures establishing communication between the air-receiving chamber and the mixing channel, and means for conveying air under pressure into the air-receiving chamber.

3. In a mixing apparatus, a mixing chamber provided with spaced, concentrically-arranged inner and outer walls producing an annular mixing channel between them, the inner wall defining an air-receiving chamber and having spaced, radially-extending hollow fingers extending into the mixing channel, the wall of each finger being angularly apertured to provide communication between said air-receiving chamber and the mixing channel, the inner wall being provided at points between the fingers with angularly-disposed apertures establishing communication between the air-receiving chamber and the mixing channel, the angularity of the apertures in the fingers and in the inner wall being such that an air stream emanating from an aperture in one of the fingers will tend to cross an air stream emanating from one aperture in the inner wall, and means for conveying air under pressure into the air-receiving chamber.

4. In a mixing apparatus, an annular mixing chamber having an outer wall, spaced air passages in said wall, each of said passages being provided with at least two air inlets establishing communication between the air passage in which they are located and the interior of the mixing chamber, the two air inlets in each passage being spaced in close proximity to one another and being disposed angularly with relation to the outer wall, but parallel to one another, the two air inlets in one passage being disposed at an angle to those in the adjacent passage, and means for conveying air under pressure into the passages.

5. In a mixing apparatus, an annular chamber provided with a plurality of angularly disposed openings for compressed air to enter the chamber and whirl therein, means for introducing a plurality of finely divided solid materials into said chamber for mixture by the whirling action of the air, the chamber having an outlet passage through which the mixed material passes after having been whirled about in the chamber, and means for spraying liquid into the path of the mixed materials, said liquid-spraying means being located in the outlet passage whereby the same acts upon the mixed materials after the same leave the mixing chamber.

SAMU-EL ISH-SHALOM.